(12) United States Patent
Foo et al.

(10) Patent No.: US 6,600,414 B2
(45) Date of Patent: Jul. 29, 2003

(54) APPARATUS AND METHOD FOR DETECTING VEHICLE ROLLOVER HAVING A DISCRIMINATING SAFING FUNCTION

(75) Inventors: Chek-Peng Foo, Ann Arbor, MI (US); Huahn-Fern Yeh, Novi, MI (US); Shun-Hsin Chang, Novi, MI (US); Kevin J. Schemansky, Howell, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/769,037

(22) Filed: Jan. 24, 2001

(65) Prior Publication Data

US 2002/0075142 A1 Jun. 20, 2002

Related U.S. Application Data

(63) Continuation-in-part of application No. 09/742,566, filed on Dec. 20, 2000.

(51) Int. Cl.[7] .................................................. B60Q 1/00
(52) U.S. Cl. ...................... 340/440; 340/436; 340/438
(58) Field of Search ................................ 340/440, 438, 340/436, 665, 666; 180/282, 290; 701/21, 34, 36, 45; 280/730.02, 730, 735, 772

(56) References Cited

U.S. PATENT DOCUMENTS

| | | | |
|---|---|---|---|
| 5,391,845 A | 2/1995 | Haas et al. | 200/61.45 R |
| 5,553,924 A | 9/1996 | Cantor et al. | 297/452.27 |
| 5,610,575 A | 3/1997 | Gioutsos | 340/429 |
| 5,825,284 A | 10/1998 | Dunwoody et al. | 340/440 |
| 5,835,873 A | 11/1998 | Darby et al. | 701/45 |
| 5,890,084 A | 3/1999 | Halasz et al. | 701/45 |
| 6,036,225 A | 3/2000 | Foo et al. | 280/735 |
| 6,038,495 A | 3/2000 | Schiffmann | 340/440 |
| 6,076,027 A * | 6/2000 | Raad et al. | 280/5.502 |
| 6,130,608 A * | 10/2000 | McKeown et al. | 340/438 |
| 6,179,310 B1 * | 1/2001 | Clare et al. | 280/124.106 |
| 6,209,910 B1 * | 4/2001 | Nagae | 280/735 |
| 6,282,474 B1 * | 8/2001 | Chou et al. | 180/271 |
| 6,301,536 B1 * | 10/2001 | Vaessen et al. | 701/45 |
| 6,484,080 B2 * | 11/2002 | Breed | 701/36 |

FOREIGN PATENT DOCUMENTS

| | | |
|---|---|---|
| DE | 10019416 A1 | 10/2001 |
| DE | 10019418 A1 | 10/2001 |
| EP | 0430813 B1 | 6/1991 |
| EP | 0934855 A1 | 8/1999 |

OTHER PUBLICATIONS

An article by BEI Systron Donner Inertial Division entitled "GyroChip™ Industrial 'Solid–State' Rotation Sensor," dated Feb. 21, 1994.

* cited by examiner

*Primary Examiner*—Van Trieu
(74) *Attorney, Agent, or Firm*—Tarolli, Sundheim, Covell & Tummino L.L.P.

(57) ABSTRACT

A vehicle rollover event detector (10) includes a rollover sensor (14). A first accelerometer (80) senses vehicle acceleration in a direction offset from the front-to-rear axis of the vehicle (12) up to a maximum acceleration sensing level and provides a first acceleration signal indicative thereof. A second accelerometer (96) senses vehicle acceleration in the offset direction at acceleration levels in excess of the maximum acceleration sensing level of the first accelerometer and provides a second acceleration signal indicative thereof. A controller (26) selects the first accelerometer or second accelerometer and provides an actuation signal (110) when the signal from the rollover sensor and the selected first or second accelerometers both indicate a vehicle rollover event.

11 Claims, 8 Drawing Sheets

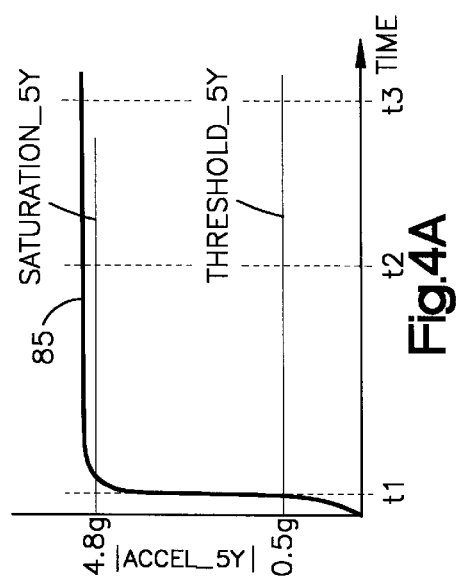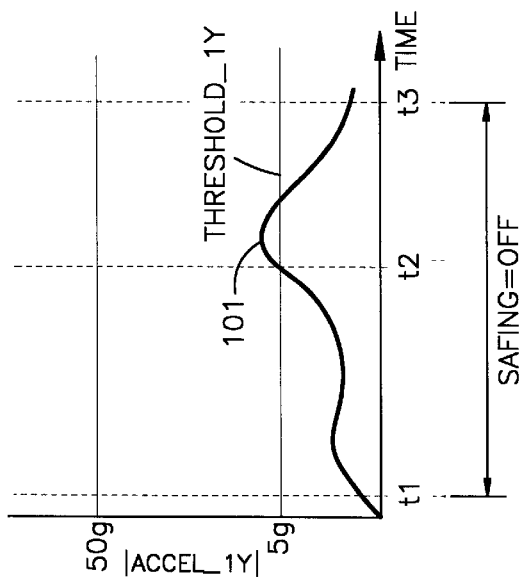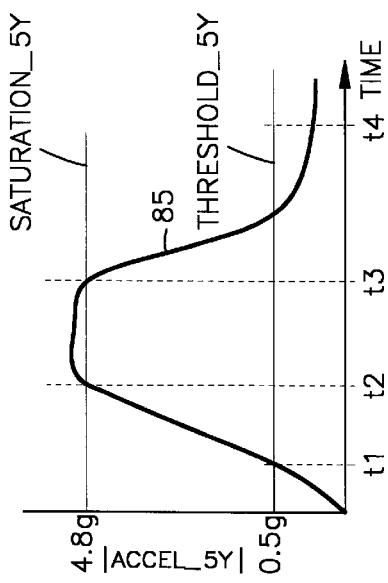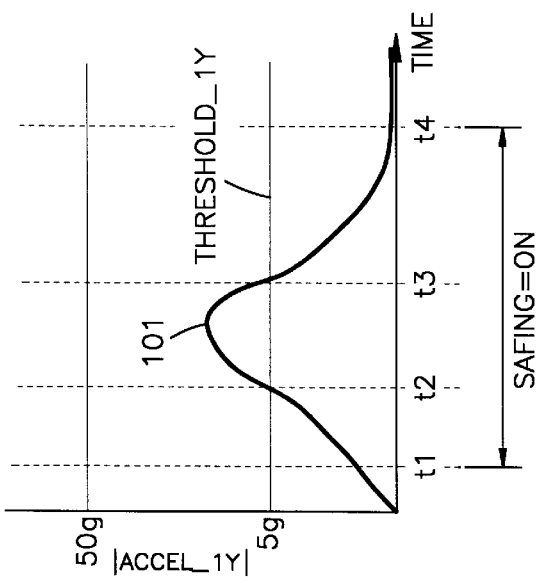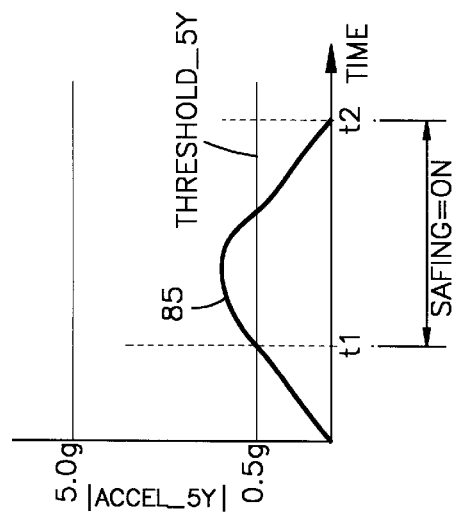

APPARATUS AND METHOD FOR DETECTING VEHICLE ROLLOVER HAVING A DISCRIMINATING SAFING FUNCTION

CROSS-REFERENCE TO RELATED APPLICATION

This application is a continuation-in-part of U.S. patent application Ser. No. 09/742,566, filed Dec. 20, 2000 in the name of Yeh et al. entitled "SYSTEM AND METHOD FOR SENSING VEHICLE ROLLOVER."

TECHNICAL FIELD

The present invention relates to an occupant protection system and, more particularly, to an apparatus and method for detecting a vehicle rollover event for use with an actuatable occupant rollover protection device.

BACKGROUND OF THE INVENTION

To detect a vehicle rollover event, a vehicle may be equipped with one or more sensors that detect vehicle dynamics. The sensors are connected to a controller that evaluates the sensor signals and controls actuation of one or more actuatable devices in response to a determined occurrence of a vehicle rollover event.

U.S. Pat. No. 5,825,284 discloses a vehicle rollover system having an acceleration sensor that provides a signal indicative of lateral acceleration of the vehicle. A processor calculates a roll-moment based on the sensor signal and provides a visual display indicating the likelihood of vehicle rollover.

U.S. Pat. Nos. 5,610,575 and 5,890,084 disclose other approaches to rollover detection.

SUMMARY OF THE INVENTION

In accordance with one aspect of the present invention, an apparatus detects a vehicle rollover event. The apparatus includes a rollover sensor sensing vehicle roll and providing a signal indicative of vehicle roll about a front-to-rear axis of the vehicle. A first accelerometer senses vehicle acceleration in a direction offset from the front-to-rear axis of the vehicle up to a maximum acceleration sensing level and provides a first acceleration signal indicative thereof. A second accelerometer senses vehicle acceleration in the offset direction at acceleration levels in excess of the maximum acceleration sensing level of the first accelerometer and provides a second acceleration signal indicative thereof. The apparatus further includes a controller for providing an actuation signal when the signal from the rollover sensor indicates a vehicle rollover condition and at least one of (i) the first acceleration signal indicates vehicle acceleration between a first threshold and said maximum acceleration sensing level, and (ii) the second acceleration signal indicates a vehicle acceleration greater than the maximum acceleration sensing level.

In accordance with another aspect of the present invention, an apparatus detects a rollover condition of a vehicle, the apparatus comprises a rollover sensor securable to the vehicle for sensing vehicle roll and providing a roll signal having a characteristic indicative thereof. An acceleration sensor senses vehicle acceleration in a direction offset from a front-to-rear axis of the vehicle and provides an acceleration signal indicative thereof. The acceleration sensor is capable of sensing vehicle acceleration. The apparatus further includes a controller determining the occurrence of a vehicle rollover condition in response to the roll signal from the rollover sensor indicating a vehicle rollover condition and the sensed acceleration in the offset direction having a value between a first acceleration threshold and a second acceleration threshold.

In accordance with another aspect of the present invention, a method detects a vehicle rollover event comprising the steps of sensing vehicle roll and providing a roll signal indicative of vehicle roll about a front-to-rear axis of the vehicle, sensing vehicle acceleration in a direction offset from the front-to-rear axis of the vehicle up to a maximum acceleration sensing level and providing a first acceleration signal indicative thereof, sensing vehicle acceleration in the offset direction at acceleration levels in excess of said maximum acceleration sensing level and providing a second acceleration signal indicative thereof, selecting one of the first acceleration signal and the second acceleration signal in response to the value of the first acceleration signal, and determining a rollover condition in response to the selected one of the acceleration signals and the sensed roll signal.

In accordance with yet another aspect of the present invention, a method detects a rollover condition of a vehicle comprising the steps of sensing vehicle roll and providing a roll signal having a characteristic indicative thereof, sensing vehicle acceleration in a direction offset from a front-to-rear axis of the vehicle and providing an acceleration signal indicative thereof, and determining the occurrence of a vehicle rollover condition in response to the roll signal indicating a vehicle rollover condition and the acceleration signal having a value between a first acceleration threshold and a second acceleration threshold.

BRIEF DESCRIPTION OF THE DRAWINGS

The invention will be understood by one skilled in the art upon consideration of the following description of an exemplary embodiment of the invention and the accompanying drawings, in which:

FIG. 2 is a graphical representation of vehicle acceleration versus time sensed by one acceleration sensor of the system of FIG. 1 during a first acceleration condition;

FIGS. 3A and 3B are graphical representations of vehicle acceleration versus time sensed by first and second acceleration sensors of the system of FIG. 1 during a second acceleration condition that would result in a SAFING ON indication;

FIGS. 4A and 4B are graphical representations of vehicle acceleration versus time sensed by first and second acceleration sensors of the system of FIG. 1 during a third acceleration condition that would result in a SAFING OFF indication;

DESCRIPTION OF AN EXEMPLARY EMBODIMENT

Figure 1:
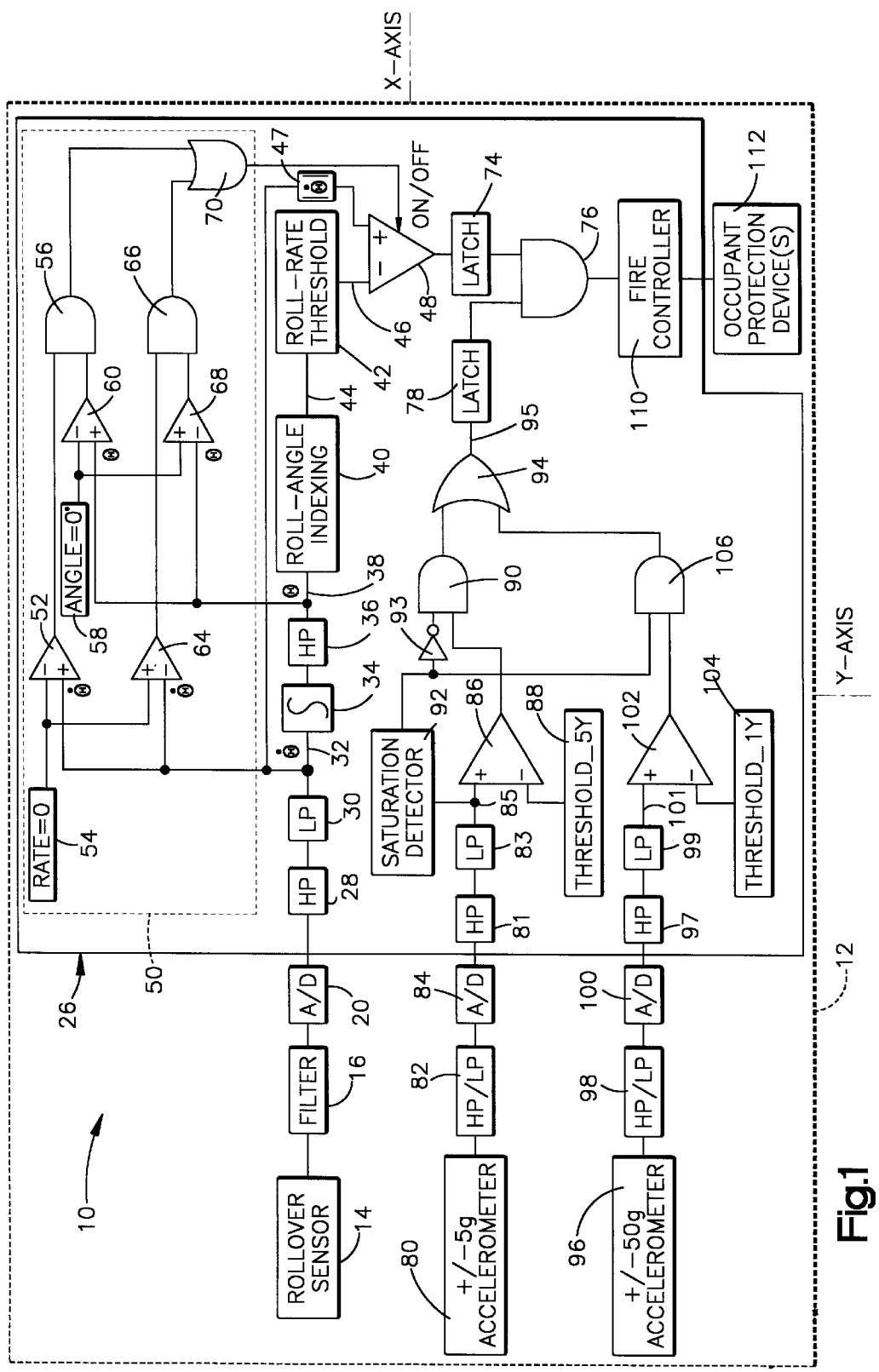
FIG. 1 is a schematic block diagram of an occupant rollover protection system in accordance with the present invention.

FIG. 1 illustrates an exemplary embodiment of an occupant rollover protection system 10 in accordance with the present invention. The system 10 is mountable in a vehicle 12. The system 10 includes a rollover discrimination sensor 14. The sensor 14 senses one or more vehicle operating characteristics or conditions that might indicate the occurrence of a vehicle rollover event. The sensor 14 provides a signal based on the sensed vehicle operating characteristic(s).

By way of example, the vehicle rollover discrimination sensor 14 is a roll-rate sensor operative to sense angular rotation of the vehicle 12 about an axis of the vehicle. The roll-rate sensor 14 may be mounted at or near a central vehicle location in the vehicle 12 and oriented so as to sense a rate of vehicle rotation about a longitudinal axis of the vehicle (e.g., an X-axis oriented parallel to or co-axial with the front-to-rear axis of the vehicle).

More particularly, the sensor 14 could be a microminiature structure configured to sense angular velocity (e.g., roll-rate) of the vehicle and fabricated using semiconductor manufacturing techniques. An example of such a sensor is the GYROCHIP™ industrial solid state rotation sensor, which is commercially available from BEI Sensors and Systems Co. of Concord, Calif. The GYROCHIP™ sensor uses the Coriolis Effect to produce an output signal having a DC voltage proportional to the rate of rotation about an axis of sensitivity of the sensor. Accordingly, when sensing a rate of angular rotation in a first direction about its axis of sensitivity, the DC output voltage from the sensor 14 is positive. Similarly, an angular rate of rotation in the other direction about the sensor axis of sensitivity provides a negative sensor output voltage. Thus, when mounted in the vehicle, the output signal of sensor 14 indicates angular velocity of the vehicle, including magnitude and angular direction, about the sensor axis of sensitivity. The axis of sensitivity of the sensor 14 is coaxial with the front-to-rear axis of the vehicle 12 through the center of the vehicle. Those skilled in the art will appreciate that the angular velocity about the vehicle's front-to-rear axis is the same as its roll-rate or rate of rotation.

Referring again to FIG. 1, the sensor 14 outputs a signal to a filter 16. The output signal of sensor 14 has an electrical characteristic indicative of the sensed rate of rotation or roll-rate of the vehicle 12. The filter 16 is selected so as to remove frequency components from the roll-rate signal that are not useful in discriminating a vehicle rollover event. These frequency values are determined using empirical methods for a vehicle platform of interest by placing the vehicle under various operating conditions. These frequency values may be unique for each vehicle platform.

The filter 16 provides a filtered roll-rate signal to an appropriate analog-to-digital ("A/D") converter 20. The A/D converter provides a digitized, filtered signal to a controller 26. The A/D converter 20 is illustrated as being external to the controller 26, although it, alternatively, could be an integral part of the controller, i.e., an A/D input of controller 26.

The elements shown in the controller block 26 correspond with functions and operations performed internally by the controller. The controller 26, for example, is a microcomputer programmed to perform the illustrated operations or functions in accordance with the present invention. Such functions alternatively could be performed with discrete circuitry, analog circuitry, a combination of analog and discrete components, and/or an application specific integrated circuit.

Additional digital filtering of the roll-rate signal preferably occurs within the controller 26. In particular, A/D converter 20 provides the digitized signal to a digital high-pass ("HP") filter function 28. The HP filter function 28 is used to eliminate DC drift that may result from the A/D conversion. The HP filter function 28 provides a high-passed filtered signal to a low-pass ("LP") filter function 30. The LP filter function 30 smoothes the roll-rate signal by removing noise and other high frequency components that are not useful in discriminating a vehicle rollover event. The LP filter function 30 provides a smoothed roll rate signal 32 to an integrator function 34 having a value indicative of vehicle roll-rate (i.e., angular velocity "dθ/dt") about the front-to-rear axis of the vehicle. The integrator function 34, in turn, integrates the roll-rate signal 32 and provides a value indicative of a relative roll-angle of the vehicle 12 that is determined based on the determined roll-rate value, i.e., the roll-rate signal 32.

The output of the integrator function 34 is digitally high-pass filtered by a high-pass ("HP") filter function 36. This HP filtering could be performed as part of the integrator function 34. The HP filter function 36 provides a signal having a value θ indicative of a normalized roll-angle of the vehicle 12 that is functionally related to the roll-rate value 32. Specifically, the roll-angle value θ at 38 indicates a relative amount of angular rotation of the vehicle determined from the sensed roll-rate. The roll-angle value θ at 38 may be reset based on a time constant selected for the filter function 36 so that the roll-angle value θ at 38 provides an indication of roll-angle of the vehicle during a time period of roll-rate. The roll-angle value θ at 38 typically will not indicate the actual roll-angle orientation of the vehicle 12 relative to the ground. In this way, the determination of a vehicle rollover event does not require a determination of an initial angular orientation of the vehicle relative to the ground or road. The rollover determination also does not require calculating an absolute angle of rotation of the vehicle relative to the ground.

The roll-angle value θ at 38 from the high-pass filter function 36 is provided to a roll-angle indexing function 40. The roll-angle indexing function 40 provides an output to an index roll-rate threshold determining function 42. The indexing function 40 divides the determined roll-angle value θ into discrete roll-angle index values 44 that are provided to the roll-rate threshold function 42. The roll-rate threshold function 42, for example, is implemented as a look-up table that stores predetermined threshold values responsive to the roll-rate index values 44. The indexing provides discrete output values in response to the roll-angle values θ at 38. These discrete output values are used to address locations in the look-up table of the roll-rate threshold function. The variable roll-rate threshold function 42 provides a roll-rate threshold 46 having a value functionally related to the index value 44 provided by the indexing function 40. Alternatively, the threshold value 46 could be calculated based on the roll-angle index value using predetermined functional relationships, i.e., functional equations. This indexing arrangement provides stepped threshold values. It is also contemplated that the roll-rate threshold value could be a continuously varying value that is functionally related to the roll-angle value θ at 32. The roll-rate threshold determining function 42 provides the threshold value 46 to a first input of a comparator function 48.

The filtered roll-rate value at 32 from the LP filtering function 30 has its absolute value determined by function 47. The absolute value of the roll rate is provided to a second input of the comparator function 48. The comparator function 48 provides an output signal based on a comparison of the absolute value of the filtered roll-rate value 32 and the indexed roll-rate threshold value 46 when the comparator is enabled. Specifically, the comparator function 48 provides an output signal having a logic level (e.g., TRUE or FALSE, HIGH or LOW) that indicates whether the absolute value of the filtered roll-rate value from low-pass filter function 30 has a predetermined relationship relative to the indexed roll-rate threshold 46. In response to the absolute value of the roll-rate value crossing or exceeding the indexed threshold value 46 (i.e., if the absolute value of the roll-rate value is greater than the indexed threshold), a TRUE or HIGH is output from comparator 48 when the comparator is enabled.

Because a vehicle rollover event will occur only when both the roll-rate and the roll-angle have the same algebraic sign, the exemplary embodiment of the system 10 includes a quadrant detection function 50. The quadrant detection function 50, for example, determines whether the roll-rate and roll-angle values are both in quadrant I (roll-rate and roll-angle are both in one direction referred to as the positive direction) or are both in quadrant III (roll-rate and roll-angle are both in a negative direction).

In FIGS. 6–11, determined roll-rate values vs. angle index values for different vehicle operating conditions are shown. Quadrants I through IV are labeled by corresponding Roman numerals. Quadrant I corresponds to a vehicle condition when both the determined relative roll-angle and roll-rate have positive values. Similarly, quadrant III corresponds to when both the determined relative roll-angle and the roll-rate both have negative values. The II and IV quadrants correspond to situations when the vehicle 12 is returning to a level, i.e., returning to a horizontal angular orientation relative to the ground. Accordingly, for the purpose of determining whether a rollover event is occurring, it is desirable to perform the comparison function 48 only when the roll-rate signal and the indexed roll-angle have values that define a point that lies in quadrants I or III (e.g., when both the roll-rate and roll-angle have the same algebraic sign). A possible occurrence of vehicle rollover event can occur when, for example, (i) the roll-angle value θ at 38 is greater than or equal to 0° and the roll-rate value dθ/dt at 32 is greater than or equal to 0 or (ii) the roll-angle value θ at 38 is less than or equal to 0° and the roll-rate value dθ/dt 32 is less than or equal to 0.

In the exemplary embodiment of the present invention shown in FIG. 1, the quadrant detection function 50 includes a comparator function 52 having a first input that receives the determined roll-rate value dθ/dt at 32. A roll-rate reference value 54 (e.g., a value indicative of a roll-rate of 0°/second) is provided to a second input of the comparator function 52. The comparator 52 determines whether the sensed roll-rate value dθ/dt is greater than or equal to the reference value 54 and provides this comparison result to an input of an AND function 56.

A roll-angle reference value 58 (e.g., a value indicative of a roll-angle of 0°) is provided to a first input of a comparator function 60. The determined relative roll-angle value θ is provided to a second input of the comparator function 60. The comparator 60 determines if the roll-angle value θ is greater than the reference value 58. The comparator 60 provides a logic output value to another input of the AND function 56 based on the comparison of the determined roll-angle value θ and the reference value 58. The AND function 56 provides a logic output signal (e.g., TRUE or FALSE, HIGH or LOW) in response to the signals from the comparators 52 and 60 indicating whether both the roll-rate and roll-angle define a point lying in quadrant I. Quadrant I includes the lines defined by the angle equal to zero and the rate equal to zero.

Similar logic is used to determine whether the roll-rate and roll-angle define a point lying in quadrant III. For example, the roll-rate value dθ/dt is provided to a first input of a comparator function 64. The roll-rate reference value 54 is provided to a second input of the comparator 64. The comparator 64 determines whether the roll-rate value dθ/dt is less than or equal to the reference value (i.e., the roll-rate is negative). The comparator function 64 provides a corresponding logic output signal to an input of an AND function 66, e.g., a TRUE when the roll-rate dθ/dt is less than the reference rate 54.

The roll-angle reference value 58 is provided to a first input of comparator function 68. The determined roll-angle value θ is provided to a second input of the comparator function 68, which, in turn, provides a corresponding logic output signal to another input of the AND function 66, e.g., a TRUE when the roll-angle θ is less than the angle reference 58. The AND function 66 provides a logic output signal (e.g., TRUE or FALSE) in response to the signals from the comparators 64 and 68 indicating whether the roll-rate dθ/dt and roll-angle θ define a point in quadrant III. Similar to quadrant I, quadrant III includes the lines defined the angle equal to zero and the rate equal to zero. The actual point (0, 0) can be considered as in quadrant I.

Assuming, for purposes of explanation, that the roll-rate value dθ/dt has a positive value and the roll-angle value θ also is positive value, then each of the comparators 52, 60 outputs a TRUE or HIGH condition to the AND function 56. The AND function 56, in turn, provides a logic TRUE output signal, which indicates that the roll-rate value and the roll-angle value define a point lying in quadrant I. The other part of the quadrant determination algorithm 50 (e.g., 64, 66, 68) performs a similar quadrant determination with AND function 66 providing a TRUE when the roll-rate value dθ/dt and the roll-angle value θ define a point lying in quadrant III.

Each of the AND functions 56 and 66 provides a respective logic output signal to an associated input of an OR function 70. The OR function 70 controls operation, i.e., enablement, of the comparator function 48. Specifically, the OR function 70 provides a control signal (e.g., TRUE or FALSE) to the comparator function 48 for controlling operation of the comparator in response to the output values from the AND functions 56 and 66. For example, when the AND function 56 provides a TRUE condition to the OR function 70 (e.g., roll-rate and roll-angle are in quadrant I), the OR function 70 provides a digital TRUE or ON or ENABLE output signal to a control input of the comparator function 48. This enables operation of the comparator function 48 to check the absolute value of the roll-rate value against the indexed roll-rate threshold value 46. The comparator function 48 also is enabled when the AND function 66 provides a digital TRUE condition to the OR function 70. The comparison function 48 is enabled only when the roll-rate and roll-angle determinations are in quadrants I and III.

In a microcomputer embodiment of the system 10, the quadrant detection algorithm 50 and control of the comparator function would be implemented as a software program stored in an appropriate internal memory. The control logic, for example, might be implemented using well known programming techniques and programming languages.

The rollover comparator function 48 of the controller 26, in accordance with the exemplary embodiment of FIG. 1, is operative or enabled to check the absolute value of the roll-rate against the roll-rate threshold only when the roll-rate and roll-angle have values that define a point in quadrant I or in quadrant III. This helps prevent against an erroneous determination of a vehicle rollover event if the roll-rate and roll-angle values are in quadrant II or IV. The roll-rate thresholds are empirically determined for a particular vehicle platform of interest in response to a plurality of different vehicle maneuvers that result in a rollover event.

Because vehicle rollover characteristics typically are the same regardless of the angular direction of rollover, a single set of roll-rate threshold values may be used for rollover discrimination in both quadrants I and III. In this example, the angle indexing function 40 provides the indexed roll-angle value to the roll-rate threshold function 42. The role rate threshold function 42 outputs its indexed threshold value 46 to the comparator 48. The comparator function 48, in turn, compares the absolute value of the magnitude of the roll-rate value dθ/dt against the corresponding indexed threshold value 46. A quadrant determination algorithm, such as 50 of FIG. 1, controls the comparator function 48 so that the absolute value of the roll-rate is compared against the indexed threshold only when the roll-rate value and roll-angle value define a point that lies in quadrant I or III. Alternatively, separate positive and negative threshold values, such as illustrated in FIGS. 6–11, may be used for roll-rate comparisons in quadrants I and III.

The output of the comparator function 48 is provided to a latch function 74. When the comparator output provides a logic TRUE signal (e.g., a digital HIGH), the latch function 74 outputs a latched TRUE signal to an input of an AND function 76. The latch function, for example, provides the logic TRUE signal for as long as the rollover event is determined to be occurring or for a minimum predetermined length of time, such as about one second and then is reset to a LOW output condition. A latch function 78 has an output that is used to provide a latched logic signal to another input of the AND function 76. A TRUE (or digital HIGH) signal from the latch function 78 represents a determined occurrence of a rollover event as determined from safing sensors discussed below. A latched TRUE condition from latch function 78 provides TRUE signal to AND function 76 for as long as the rollover event is determined from the safing sensors or for a minimum predetermined time period, such as about one second, and then reset to a LOW output. The latching functions 74 and 78 can be implemented in several ways including using counters to hold a logic state in response to its count. The counter can be incremented up or down. The state of the output would switch in response to the count.

In accordance with one exemplary embodiment, a first safing sensor includes an acceleration sensing device, such as an accelerometer 80. The accelerometer 80 is mounted to vehicle 12 with the sensor's axis of sensitivity oriented so as to sense lateral acceleration of the vehicle 12 (e.g., side-to-side acceleration in a direction parallel to the Y-axis of the vehicle). Generally, the axis of sensitivity of the accelerometer 80 is offset from the front-to-rear axis of the vehicle 12 and preferably, transverse to the front-to-rear axis.

In this exemplary embodiment, the accelerometer 80 has the ability of measuring acceleration up to a maximum level of acceleration. In this exemplary embodiment, the accelerometer 80 is a bi-directional ±5 g accelerometer (g being the value of acceleration due to earth's gravity, i.e., 32 feet/sec$^2$ or 9.8 meters/sec.$^2$). The accelerometer 80 outputs about 400 mV/g over its operative sensing range of ±5 g. Consequently, the accelerometer 80 is particularly useful in sensing vehicle dynamics associated with slow developing, low g, roll events, such as a non-impact induced vehicle rollover event. The accelerometer 80 provides a signal having an electrical characteristic indicative of the sensed lateral acceleration of the vehicle 12. The signal from the accelerometer 80 is provided to a filter network 82 formed of an appropriate combination of high-pass and low-pass filters. Additional filtering also may occur within the controller 26, such as through digital filtering techniques.

The filter network 82 provides a filtered lateral acceleration signal to an appropriate A/D converter 84. The A/D converter 84 could be internal to or external from the controller 26. The A/D converter 84, in turn, provides the digitized signal to the input of a HP digital filter 81 of controller 26. The HP filter 81 eliminates any DC drift resulting from the A/D conversion. The output of HP filter 81 is connected to a digital LP filter 83 of controller 26 to further remove high frequencies that are not useful in determining the occurrence of a rollover event. The output of the LP filter 83 is a digitized signal 85 applied to a first input of a comparator function 86. A lateral acceleration threshold function 88 provides a threshold ("THRESHOLD_5Y") to a second input of the comparator function 86. The acceleration threshold 88 is selected to have a value substantially less than the maximum output voltage rating of the accelerometer 80 when subjected to an acceleration of 5 g's or greater. For example, the value for THRESHOLD_5Y could be voltage value equal to approximately ten percent of the maximum expected output voltage. The comparator function 86, in turn, provides a logic signal (e.g., TRUE or FALSE) to a first input of an AND function 90 indicating whether the digitized lateral acceleration signal 85 exceeds the lateral acceleration threshold 88.

FIG. 2 illustrates an example of an absolute acceleration signal 85 ("|ACCEL_5Y|") from the accelerometer 80 as a function of time for a particular vehicle roll event. In this example, the threshold, indicated at THRESHOLD_5Y, is selected to be a voltage value that would be expected if the accelerometer 80 was subjected to an acceleration of about 0.5 g. The acceleration signal 85 crosses THRESHOLD_5Y at time $t_1$, but does not reach a level of acceleration near its maximum possible voltage value which is the voltage value that would be expected if the accelerometer 80 was subjected to an acceleration of about 5.0 g. Once the acceleration signal 85 exceeds THRESHOLD_5Y, the latching function 78 latches its output to an ON or TRUE state and holds the safing indication ("SAFING") ON from $t_1$, to a predetermined time $t_2$ that is after the value of 85 drops below the threshold value 88. In this manner, the occurrence of a vehicle rollover condition may be determined even when the AND function 90 does not provide a TRUE output contemporaneously with the latch 74 providing a logic TRUE output signal. Although, for purposes of brevity, the example of FIG. 2 shows the acceleration signal 85 and associated threshold as being positive values, the system 10 also contemplates a corresponding negative threshold for use with negative values of sensed acceleration, i.e., a roll event in the opposite direction.

Referring back to FIG. 1, the digitized acceleration signal 85 is provided to an input of a saturation detector function 92. The saturation detector function 92 determines whether the digitized acceleration signal is saturated, i.e., at its maximum value as would occur if the accelerometer is subjected to an acceleration of 5 g's or greater. To determine if the accelerometer 80 is in a saturated state, the saturation detector compares the acceleration value (voltage value) against an acceleration value slightly less that the maximum 5 g value such as a voltage value equivalent to ±4.8 g. When the acceleration signal is saturated, it is considered to be in a "railed" condition.

In accordance with the present invention, the saturation of accelerometer 80 (a low g sensor) is used to control which safing accelerometer provides the safing function. The saturation detector function 92 provides a logic output signal (e.g., TRUE or FALSE) indicating whether the railed condition exists. The saturation detector function 92 provides a TRUE output signal in response to the determined railed condition. The saturation detector 92 includes an internal latching device or flag. The output of the saturation detector 92 is initially set to an OFF or FALSE condition, i.e., the accelerometer 80 is not railed. Once a saturation condition is detected, the internal latch or flag, and in turn, the output of 92 is set to an ON or TRUE state and is held in that state for either a predetermined time period or until reset in another desired manner so as to provide a desired control. The saturation detector function 92 provides the signal to an inverter 93 which is, in turn, connected to the second input of the AND function 90. The output of the AND function 90 can only be TRUE when the output of the saturation detector 92 is FALSE, i.e., a railed condition has not been detected, and the lateral acceleration sensed by the accelerometer 80 is greater than the threshold value 88.

As mentioned, a saturation threshold ("SATURATION_5Y") used by the saturation detector 92 is a value slightly less than the maximum expected voltage value from the accelerometer 80 when subjected to an acceleration at its maximum sensor rating. Since 5 g is the maximum sensing rating, a threshold SATURATION_5Y value is set to a voltage value that would be commensurate with the expected output voltage when the accelerometer is subjected to an acceleration of, for example, 4.8 g's.

The AND function 90 provides a logic TRUE output signal when (i) the saturation detector function provides a FALSE logic output signal (e.g., a railed condition has not been detected) and (ii) the comparator function 86 provides a logic TRUE condition (e.g., the sensed acceleration exceeds the threshold 88). The AND function 90, in turn, provides a logic output signal to an input of an OR function 94. The OR function 94, in turn, provides a logic output to the latch function 78. The OR function 94 outputs a HIGH or TRUE when either of its inputs is HIGH or TRUE.

The system 10 further includes a second safing acceleration sensor, such as an accelerometer 96, oriented to sense lateral or sideways acceleration of the vehicle preferably along the same axis as that of accelerometer 80. In this exemplary embodiment, the accelerometer 96 senses vehicle acceleration in a direction parallel to the Y axis (transverse to the front-to-rear axis of the vehicle), which is the same preferable direction along which accelerometer 80 senses vehicle acceleration. The accelerometer 96, in accordance with the present invention, has a substantially higher acceleration sensing range than that of accelerometer 80. In this exemplary embodiment, the accelerometer 96 has a rating of ±50 g. The accelerometer 80 is referred to as a low g sensor and the accelerometer 96 is referred to as a high g sensor.

The accelerometer 96 outputs about 40 mV/g over its operating range. Accordingly, the accelerometer 96 is particular useful for sensing vehicle dynamics associated with fast developing rollover events, such as an impact-induced vehicle rollover event. Other relationships of sensor operating ranges of accelerometers 80 and 96 also could be used in accordance with the present invention.

The accelerometer 96 provides an acceleration signal indicative of sensed acceleration to an appropriate filter network 98 formed of high-pass and low-pass filters. The filter network 98 provides a filtered signal to an appropriate A/D converter 100. The A/D converter 100 provides a digitized indication of the vehicle acceleration to a digital HP filter 97 to eliminate the DC drift that could result from the A/D conversion. The output of the HP filter 97 is connected to a LP filter 99 which removes high frequencies that are not useful in determining a rollover event. The output signal 101 of the LP filter 99 is converted to the absolute value by the controller 26. This absolute value of the filtered accelerometer signal is provided to a first input of a comparator function 102. An acceleration threshold function 104 provides a reference acceleration threshold ("THRESHOLD_1Y") to a second input of the comparator function 102. The acceleration THRESHOLD_1Y is greater than the acceleration threshold THRESHOLD_5Y and substantially less than the maximum voltage value that is expected from the accelerometer 96 when the accelerometer is subjected to an acceleration of 50 g. For example, the threshold THRESHOLD_1Y is set to a value commensurate with the voltage value one would expect from accelerometer 96 when it is subject to an acceleration equal to 5 g.

The comparator function 102 provides a logic output to an input of an AND function 106 indicating whether the sensed acceleration exceeds the threshold THRESHOLD_1Y from the threshold function 104. The output of the saturation detector function 92 is provided to another input of the AND function 106. The AND function 106, thus, provides a logic output signal indicating whether the accelerometer 80 is in a railed or saturated condition and the acceleration sensed by the accelerometer 96 exceeds the threshold THRESHOLD_1Y provided by the threshold function 104. In particular, the AND function 106 provides a TRUE logic output signal when (i) the accelerometer 80 is in a railed condition (i.e., the acceleration signal is saturated as would occur when the vehicle is subjected to a very large acceleration event) and (ii) the acceleration sensed by the second accelerometer 96 exceeds the threshold THRESHOLD_1Y. The logic output from the AND function 106 is provided to a second input of the OR function 94.

The OR function 94 provides a safing signal 95 to the latch function 78. In particular, the safing signal 95 is TRUE (e.g., ON or HIGH) when either of two vehicle sideways acceleration events occur. First, the safing signal 95 is ON when the acceleration sensed by the accelerometer 80 exceeds the threshold THRESHOLD_5Y, and the accelerometer 80 does not indicate that it is in a railed condition. As previously mentioned, a railed condition exists when the digitized acceleration signal approximates the maximum rating value of the accelerometer 80. Second, the sating signal 95 is ON when the accelerometer 80 is determined to be in a railed condition and the acceleration sensed by the accelerometer 96 exceeds the threshold THRESHOLD_1Y.

The saturation detector acts as a switch to control if the HIGH or LOW g sensor is used for the safing function. If the accelerometer 80 is not saturated, the saturation detector 92 outputs a LOW which, in effect, enables AND function 90 and disables AND function 106. When the accelerometer 80 is saturated, the saturation detector 92 outputs a HIGH which, in effect, disables AND function 90 and enables AND function 106.

When the safing signal 95 is switched to an ON or TRUE condition, the latch function 78 latches the occurrence of a logic TRUE signal and applies a latched TRUE to a second input of the AND function 76. More particularly, the OR function 94 provides a digital logic output 95 to the latch function 78. The logic output 95 indicates the Boolean result of OR-ing the outputs from the AND functions 90 and 106. The latch function 78 is operative to latch a logic TRUE or ON output signal 95 and apply the latched TRUE signal to the AND function 76 for a predetermined time period, such as about one second. Other latching durations could be used depending on the vehicle platform and the desired control.

The AND function 76 provides a logic output (e.g., TRUE) indicating when the roll-rate exceeds the variable roll-rate threshold 46 and at least one of the sensed safing conditions has been satisfied. Because the latch functions 74 and 78 are each configured to latch TRUE signals, the occurrence of a vehicle rollover event may be determined even when the AND functions 90 or 106 do not provide TRUE condition output signals contemporaneously with the comparator function 48 providing a logic TRUE output. The output of the AND function 76 is provided to a fire controller function 110 which controls actuation of one or more actuatable occupant protection devices 112.

FIGS. 3A and 3B illustrate a vehicle operating event where the SAFING function goes TRUE and the latching function 78 maintains a SAFING TRUE condition for a time period. FIG. 3A shows the absolute value of the acceleration signal 85 ("|ACCEL_5Y|") from the accelerometer 80 as a function of time for a particular vehicle event. FIG. 3B shows the absolute value of the acceleration signal 101 ("|ACCEL_1Y|") from the accelerometer 96 as a function of time for the same particular vehicle event. Referring to the plot shown in FIG. 3A, at time $t_1$, the acceleration signal 85 exceeds the THRESHOLD_5Y, which is a voltage value commensurate with that voltage the sensor would output when subject to an acceleration of about 0.5 g. The saturation threshold ("SATURATION_5Y") is set at a voltage value commensurate with that voltage the sensor 80 would output when subjected to an acceleration of 4.8 g. At $t_1$, the input of the AND function 90 of FIG. 1 from inverter 93 is a TRUE condition and the input of the AND function 90 from comparator 86 is TRUE. The output of AND function 90 is TRUE and the OR function 94 provides a safing signal (a TRUE or HIGH) 95 to the latching function 78. In contrast, the acceleration signal 101 in FIG. 3B does not exceed THRESHOLD_1Y at time $t_1$. In this example, the THRESHOLD_1Y value is selected to be a voltage value that would be expected if the accelerometer 96 was subjected to an acceleration of about 5 g, which is substantially greater than the THRESHOLD_5Y.

Returning to FIG. 3A, between $t_1$ and $t_2$, the acceleration signal 85 continuous to increase and, at $t_2$, it exceeds SATURATION_5Y level and the accelerometer 80 is then considered to be railed, i.e., that accelerometer is at an acceleration value outside of its sensing range. As a result, the output of the saturation detector 92 switches to a HIGH which results in the AND function 90 switching to a FALSE or LOW. Between $t_2$ and $t_3$, the acceleration signal 85 continuously exceeds SATURATION_5Y level.

However, as can be appreciated in FIG. 3B, between $t_1$ and $t_2$, the acceleration signal 101 continues to increase and, at $t_2$, it exceeds the THRESHOLD_1Y. As a result, the AND function 106 of FIG. 1 provides a TRUE condition to the OR function 94 thereby allowing the latching function 78 to maintain a TRUE state and provide a SAFING TRUE condition. Between $t_2$ and $t_3$, the acceleration signal 101 continuously exceeds THRESHOLD_1Y.

Returning to FIG. 3A, at $t_3$, the acceleration signal 85 falls below SATURATION_5Y level, causing the output of the saturation detector to switch to a FALSE or LOW thereby causing the AND function 90 to provide a TRUE condition. In contrast, at $t_3$, the acceleration signal 101 in FIG. 3B the acceleration value from accelerometer 96 falls below the THRESHOLD_1Y and the AND function 106 outputs a FALSE condition. Shortly after $t_3$, the acceleration signal 85 falls below THRESHOLD_5Y and the AND function 90 outputs a FALSE condition. At this point in time, although the OR function 94 no longer provides a SAFING TRUE signal 95 to the latching function 78, the latching function 78 holds the SAFING condition TRUE until it reaches a predetermined time period, in this example, from the point in time when both AND functions 90 and 106 output a FALSE condition to $t_4$.

FIGS. 4A and 4B illustrate another example of a SAFING condition. FIG. 4A is an example of an absolute value of the acceleration signal 85 from the accelerometer 80 as a function of time for a particular vehicle event. FIG. 4B is an example of an absolute value of the acceleration signal 101 from the accelerometer 96 as a function of time during this vehicle event. In FIG. 4A, approximately at $t_1$, the acceleration signal 85 exceeds the THRESHOLD_5Y and SATURATION_5Y level. The acceleration signal 85 thereon remains above SATURATION_5Y level. As a result, the output of the saturation detector is TRUE and the output signal of the AND function 90 is a logic FALSE. Turning to FIG. 4B, between $t_1$ and $t_2$, the acceleration signal 101 remains below THRESHOLD_1Y and the output signal of the AND function 106 is a logic FALSE. As a result, the latching function 78 does not provide a SAFING condition between $t_1$ and $t_2$.

At $t_2$, the acceleration signal 101 exceeds THRESHOLD_1Y and, because the acceleration signal 85 is above SATURATION_5Y level, the output signal of the AND function 106 is a logic TRUE. Consequently, the OR function 94 provides a SAFING TRUE signal 95 to the latching function 78 which latches the SAFING TRUE condition.

Shortly after $t_2$, the acceleration signal 101 falls below THRESHOLD_1Y and the AND function 106 outputs a FALSE condition. At this point in time, although the OR function 94 no longer provides a SAFING TRUE signal 95 to the latching function 78, the latching function 78 holds the SAFING condition TRUE until it reaches a predetermined time period which, in this example, does not expire until $t_3$.

By way of example, the occupant protection device 112 could be an inflatable occupant protection device (e.g., an air bag or air curtain), a seat belt pretensioner device, an actuatable roll bar and/or other actuatable devices capable of helping protect an occupant during a vehicle rollover condition.

Figure 5A:
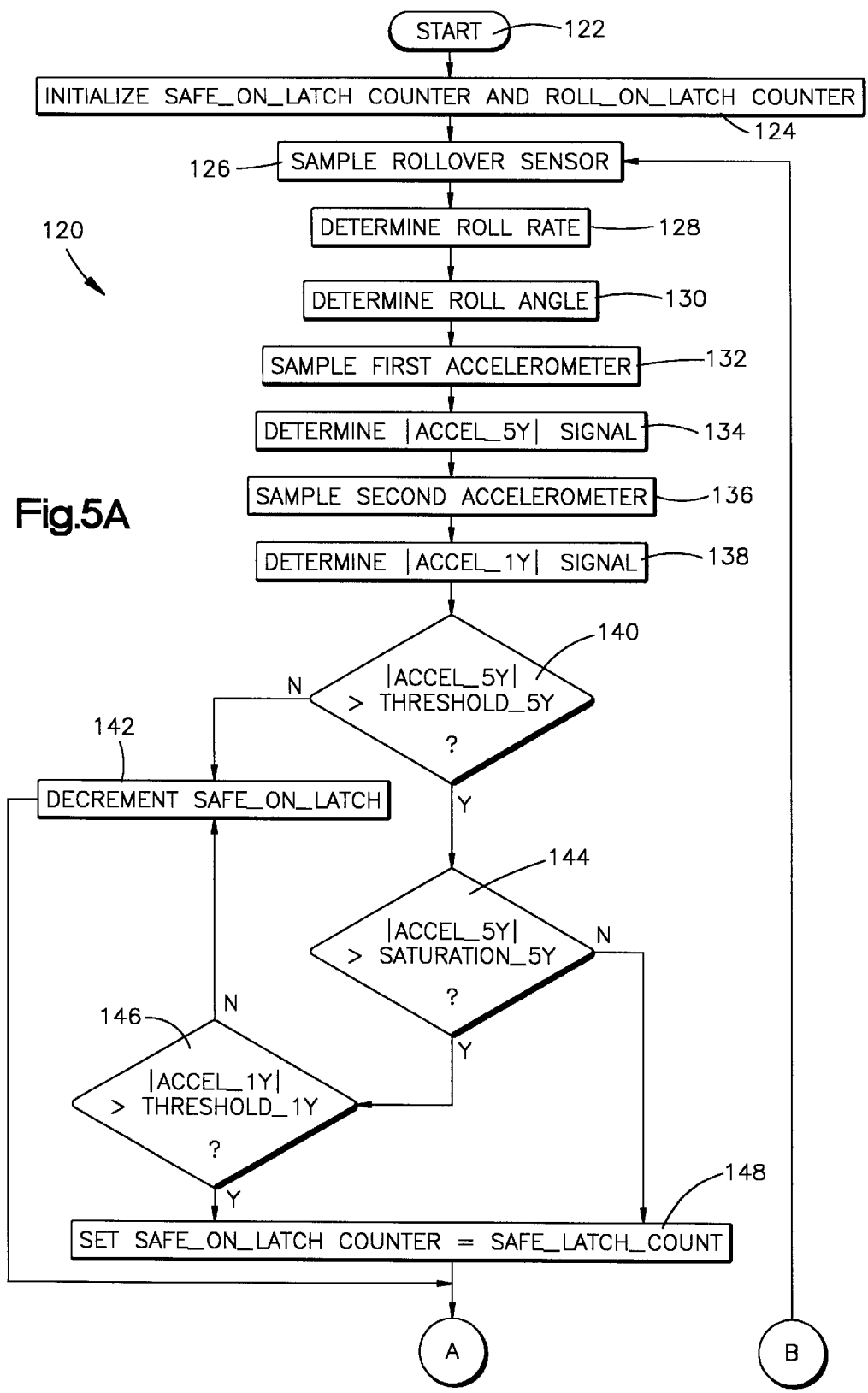
FIGS. 5A and 5B are flow diagrams illustrating a control process of the present invention.
Figure 5B:
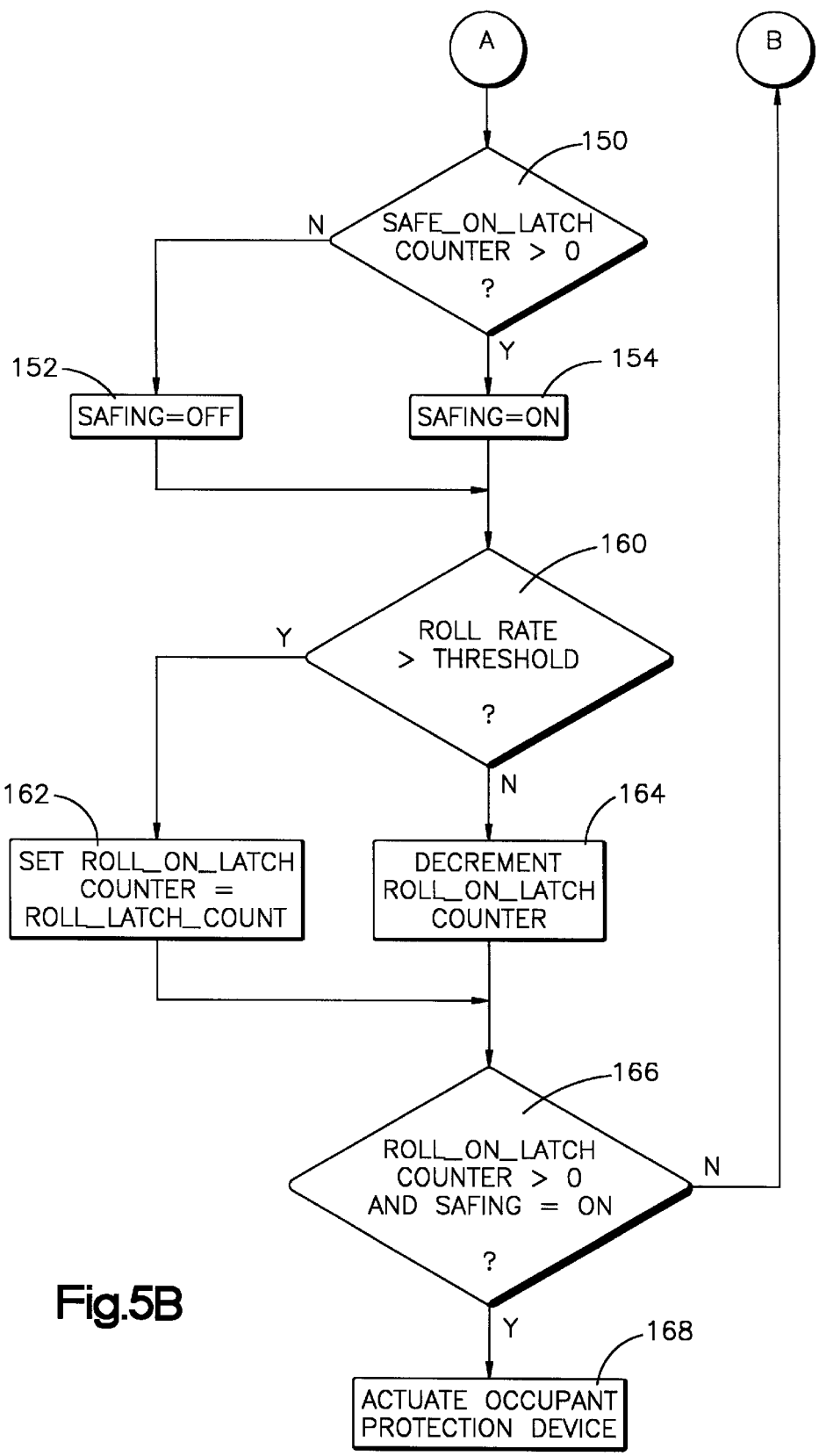

In view of the exemplary embodiment described above, the operation of the safing functions implemented by the system 10 of FIG. 1 will be better appreciated with reference to a control process in accordance with the present invention shown in FIGS. 5A and 5B.

Referring to FIG. 5A, the control process 120 begins at step 122, such as occurs at power-up, in which parameters are initiated and flag conditions are set to their starting values. In particular, process 120 proceeds to step 124 in which a SAFE_ON_LATCH counter and a ROLL_ON_LATCH counter are initialized. The SAFE_ON_LATCH counter and the ROLL_ON_LATCH counter are configured to provide their respective output signals for a predetermined time period. This is implemented, for example by the latching functions 74 (i.e., ROLL_ON_LATCH counter) and 78 (i.e., SAFE_ON_LATCH counter). In this manner, the occurrence of a vehicle rollover event may be determined even when the AND functions 90, 106 do not provide TRUE condition output signals contemporaneously with the comparator function 48 providing a logic TRUE output signal depending on the particular vehicle platform of interest.

From step 124, process 120 proceeds to step 126 in which the rollover sensor 14 is sampled. At step 128, process 120 determines the roll-rate signal dθ/dt at 32 having an electrical characteristic indicative of the angular velocity of the vehicle. At step 130, process 120 determines the roll-angle θ at 38. Process 120 proceeds to step 132.

At step 132, the low g accelerometer (i.e., ±5 g accelerometer 80) is sampled. This is implemented by the controller 26 of FIG. 1 sampling the digitized acceleration signal from the accelerometer 80. At step 134, process 120 determines the absolute value or disregards the sign of the digitized acceleration signal 85, |ACCEL_5Y| signal, from the first accelerometer 80. At step 136, the high g accelerometer (i.e., ±50 g accelerometer 96) is sampled. For example, this is implemented by the controller 26 sampling the digitized acceleration signal from the accelerometer 96. At step 138, process 120 determines the absolute value or disregards the sign of the digitized acceleration signal 101, |ACCEL_1Y| signal, from the second accelerometer 96. From step 136, process 120 proceeds to step 140.

At step 140, a determination is made whether the |ACCEL_5Y| signal indicates a level of acceleration that exceeds the threshold level, THRESHOLD_5Y. THRESHOLD_5Y is selected to be substantially less than the rating value of the associated acceleration sensor 80 that provides the |ACCEL_5Y| signal. This is implemented, for example, by the comparator function 86 of FIG. 1 comparing the |ACCEL_5Y| signal from accelerometer 80 with THRESHOLD_5Y. If the determination at step 140 is negative, process 120 proceeds to step 142. At step 142, process 120 decrements the SAFE_ON_LATCH counter by a predetermined value that is determined during system 12 calibration. From step 142, process 120 proceeds to step 150 in FIG. 5B. In contrast, in the event that the determination at step 140 is affirmative, indicating that the |ACCEL_5Y| signal exceeds THRESHOLD_5Y, process 120 proceeds to step 144.

At step 144, a determination is made as to whether the |ACCEL_5Y| signal is greater than the saturation level, SATURATION_5Y. The SATURATION_5Y level is determined to exist when the |ACCEL_5Y| signal indicates a level of acceleration that at least approximates the rating value of the respective acceleration sensor 80 of FIG. 1. If the determination at step 144 is affirmative, thereby indicating that the |ACCEL_5Y| signal is at saturation, the process proceeds to step 146.

At step 146, a determination is made as to whether the |ACCEL_1Y| signal exceeds the threshold level, THRESHOLD_1Y. This is implemented, for example, by the comparator function 102 of FIG. 1 comparing the |ACCEL_1Y| signal from accelerometer 96 with THRESHOLD_1Y. If the determination at step 146 is negative, process 120 proceeds to step 142. At step 142, process 120 decrements the SAFE_ON_LATCH counter by the predetermined value determined during system 12 calibration. From step 142, process 120 proceeds to step 150 in FIG. 5B. However, if the |ACCEL_1Y| signal exceeds THRESHOLD_1Y, process 120 proceeds to step 148. At step 148, the SAFE_ON_LATCH counter is set to equal to SAFE_LATCH_COUNT, a predetermined value determined during system 12 calibration. From step 148, process 120 proceeds to step 150 in FIG. 5B.

Referring to FIG. 5B, at step 150, a determination is made whether the SAFE_ON_LATCH counter is greater than zero. In the event the SAFE_ON _LATCH counter is not greater than zero, process 120 proceeds to step 152 where a safing flag condition, SAFING, is set to OFF or FALSE condition. From step 152, proceeds to step 160. In contrast, if at step 150 the SAFE_ON_LATCH counter is greater than zero, then process 120 proceeds to step 154 where SAFING is set to ON or TRUE condition. From step 154, process 120 proceeds to step 160.

At step 160, a determination is made concerning the determined roll-rate or angular velocity versus a corresponding roll-rate threshold 46 of FIG. 1 ("THRESHOLD"). THRESHOLD is a variable threshold value functionally related to the relative roll-angle. As shown in FIG. 1, the relative roll-angle θ at 38 is determined by integrating 34 the sensed roll-rate signal dθ/dt 32. Returning to FIG. 5B, in the event that the determined roll-rate dθ/dt does not exceed THRESHOLD, process 120 proceeds to step 164. At step 164, the controller 26 decrements the ROLL_ON_LATCH counter by a predetermined value that is determined during system 12 calibration which is dependent upon the vehicle platform of interest. From step 164, process 120 proceeds to step 166. In contrast, if the determined roll-rate dθ/dt exceeds THRESHOLD, process 120 proceeds to step 162.

At step 162, the ROLL_ON_LATCH counter is set to equal a predetermined count value ROLL_LATCH_COUNT, determined during system 12 calibration. From step 164, process 120 proceeds to step 166. At step 166, a determination is made whether the ROLL_ON_LATCH counter is greater than zero and the SAFING condition is ON. If the determination is affirmative, process 120 proceeds to step 168 where one or more selected actuatable occupant protection devices are actuated. That is, if the determination at step 166 is affirmative, a vehicle rollover event is determined to be occurring for which it is desirable to actuate actuatable occupant protection equipment for helping protect and/or cushion the vehicle occupant during vehicle rollover event. In contrast, if the determination at step 166 is negative, process 120 loops back to step 126 in which the roll-rate sensor 14 is sampled again.

A vehicle rollover crash event is a complex condition with many different factors potentially producing a rollover event. Some factors that may contribute to a vehicle rollover condition include, for example, excessive lateral acceleration, path cross-slope on or off road, tipping interferences such as curbs, soft ground, or other obstructions. Consequently, rollover safing, such as with the lateral accelerometers (e.g., 80 and 96), may not occur simultaneously with the roll-rate (32) exceeding the roll-rate threshold (46). Therefore, a safing ON condition signal is latched (e.g., by latch 78 of FIG. 1) for a predetermined time period, such as about one second. The rollover condition signal also is latched (e.g., by latch 74 of FIG. 1) for a predetermined time period of, for example, about one second. In this way, there is an increased likelihood that the latched (78) safing ON condition signal and the latched (74) rollover condition signal will overlap during a vehicle rollover condition and a rollover event discriminated. Whether or not there is overlap, in accordance with the exemplary embodiment of FIG. 1, discriminates between deployment and non-deployment vehicle rollover event.

FIGS. 6–11 illustrate examples of vehicle roll-rate dynamics plotted against the roll-rate thresholds for different types of vehicle operating maneuvers. These include both rollover and non-rollover events. The variable roll-rate thresholds are indicated at $T_I$ and $T_{III}$ in quadrants one and three, respectively, for each of FIGS. 6–11. The sensed vehicle roll-rate characteristics are shown as a series of dots in each figure as a function of the angle index (e.g., the value provided by roll-angle indexing function 40 of FIG. 1).

Figure 6:
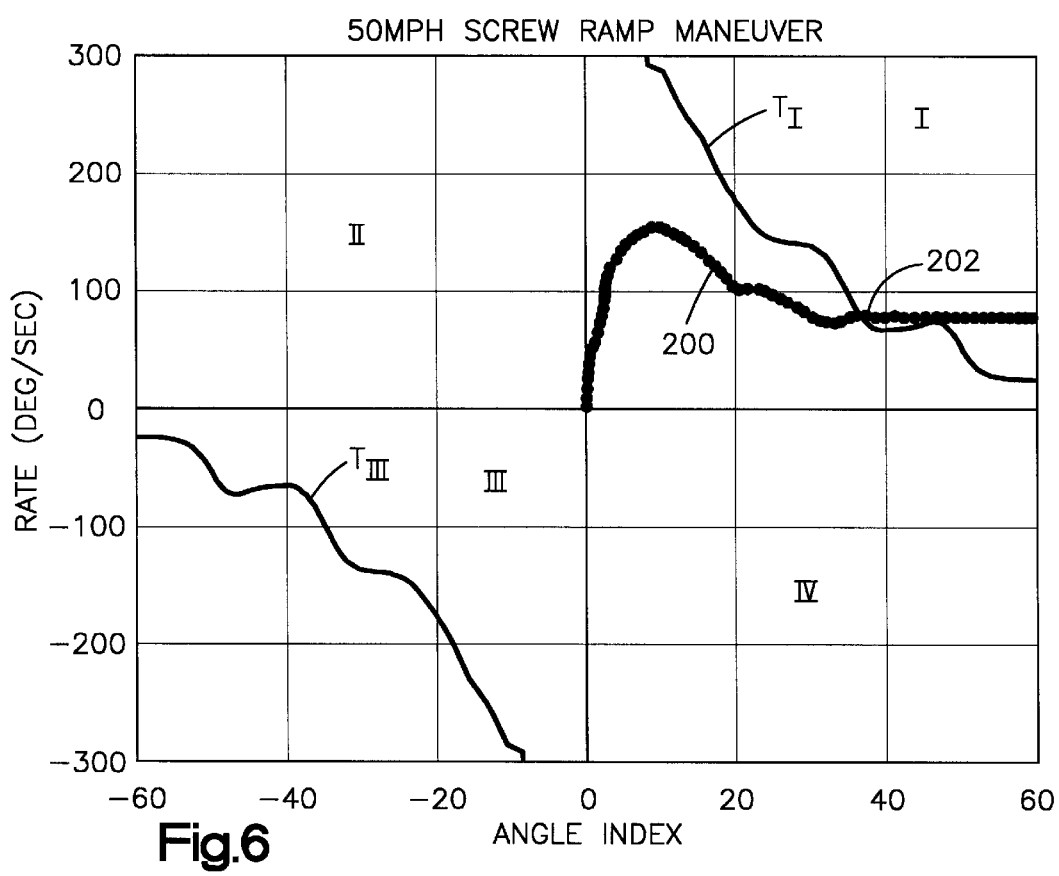
FIGS. 6–9 are graphical representations of roll-rate versus roll-angle index during various types of vehicle operating events that result in rollover detection in accordance with the present invention.

FIG. 6 shows an example of a 50 mile per hour screw ramp maneuver for a particular vehicle platform. In a screw ramp rollover event, the vehicle leaves the ground and rolls after it hits a screw ramp. This rollover condition is characterized in that the vehicle roll-rate is fast enough to roll the vehicle past a critical angle so as to prevent gravitational forces from returning the vehicle to normal orientation relative to the ground. The sensed roll-rate values, indicated at 200 for corresponding indexed roll-angle values, are shown by dots in the graph. The roll-rate value crosses the threshold $T_I$ at a roll-angle of about 35°, indicated at 202. Consequently, appropriate occupant protection device(s) would be actuated in this situation provided that one or more of the latched safing conditions also are satisfied at that same time interval so that the output of AND function 76 is TRUE.

Figure 7:
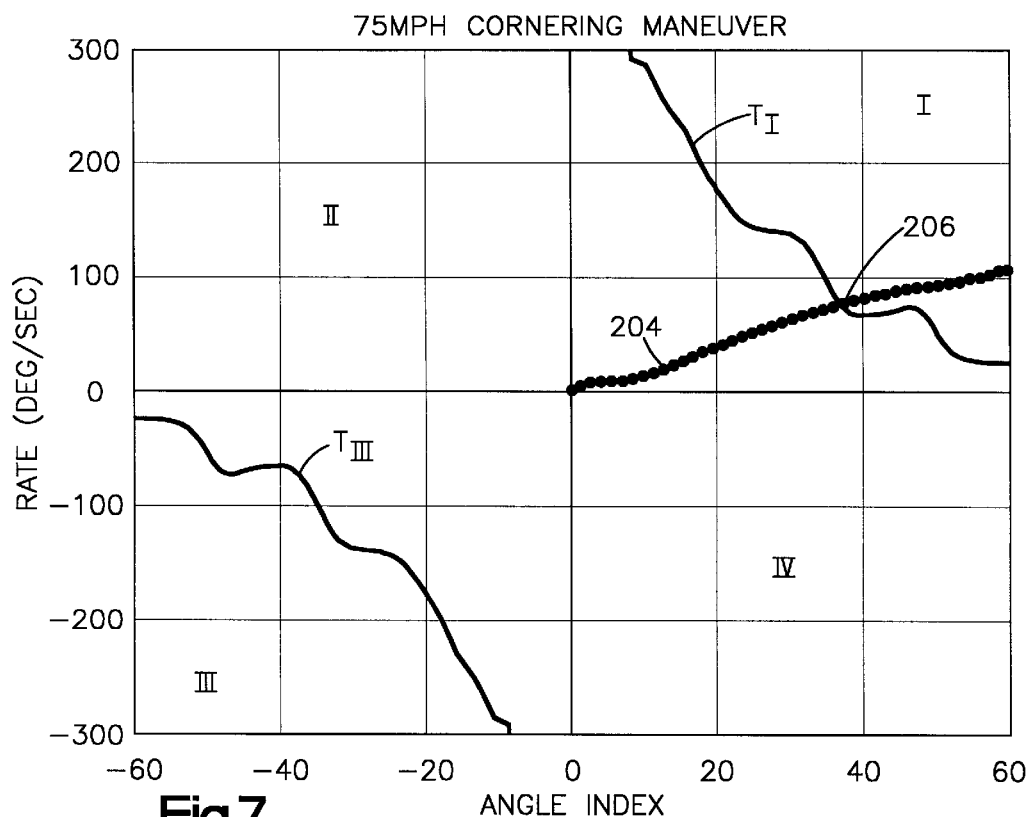

FIG. 7 shows an example of a 75 mile per hour cornering maneuver for a particular vehicle platform in which the vehicle steering (i.e., angle of the steerable wheels) is at about 7.5° relative to a center steering position. The values of the vehicle roll-rate as a function of the roll-angle index are represented by dots at 204. This type of rollover condition begins with a zero roll-rate and the roll-rate develops slowly due, at least in part, to the dynamics of tire force. The roll-rate increases with an increase in the roll-angle index, crossing the roll-rate threshold $T_I$ at a roll-angle of about 35°, indicated at 206. This indicates a vehicle rollover event, which will result in actuation of appropriate occupant protection device(s) provided that at least one of the latched safing criteria also is satisfied at that same time interval so that the output of AND function 76 is TRUE.

Figure 8:
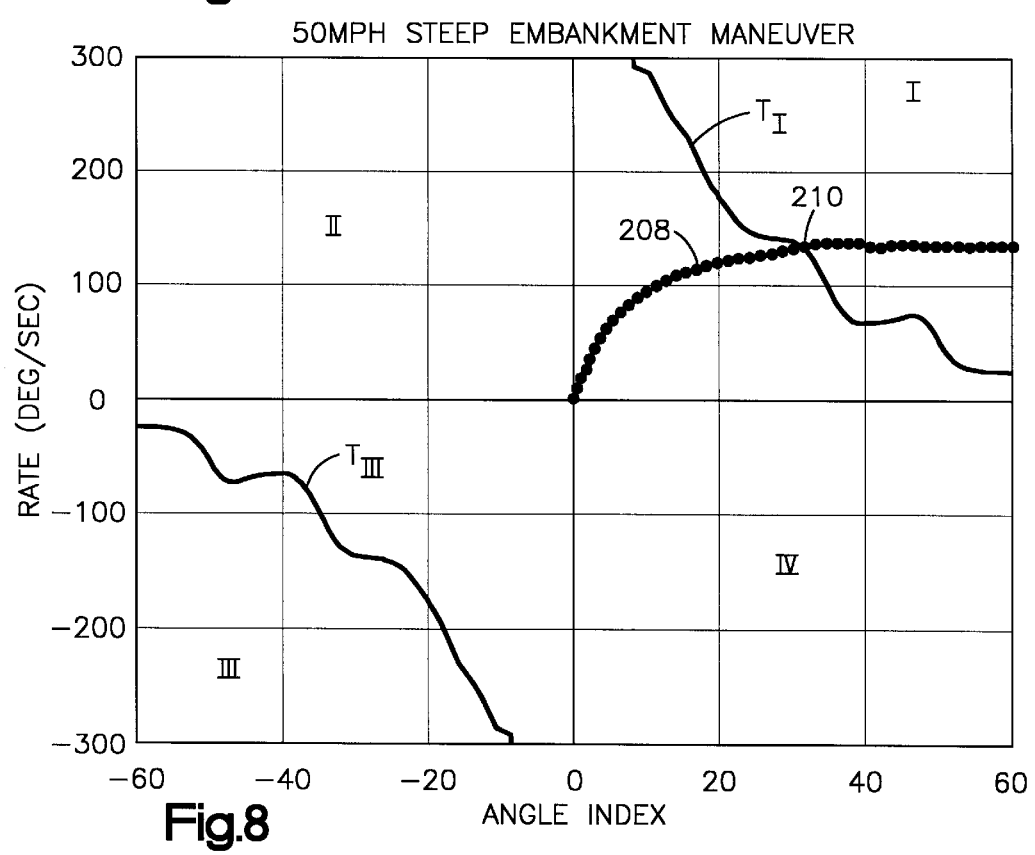

FIG. 8 shows an example of a rollover condition for a steep embankment maneuver at about 50 miles per hour. In a steep embankment maneuver, the vehicle travels along an embankment having an angle of at least about a 10° angle, which results in an initial angle for the vehicle about its long axis (e.g., the X-axis of FIG. 1). The roll-rate values versus roll-angle for the steep embankment maneuver are indicated by as series of dots at 208. The roll-rate values 208 are similar to that of the cornering rollover condition of FIG. 7, although the roll-rate initially increases more rapidly as function of roll-angle. This is due to the initial angular orientation of the vehicle traveling on the embankment. A vehicle rollover condition is determined when the roll-rate crosses the threshold $T_I$ at an indexed roll-angle of about 30°, indicated at 210. An occupant protection device would be actuated provided that one of the latched safing criteria also is satisfied at that same interval so that the output of AND function 76 is TRUE.

Figure 9:
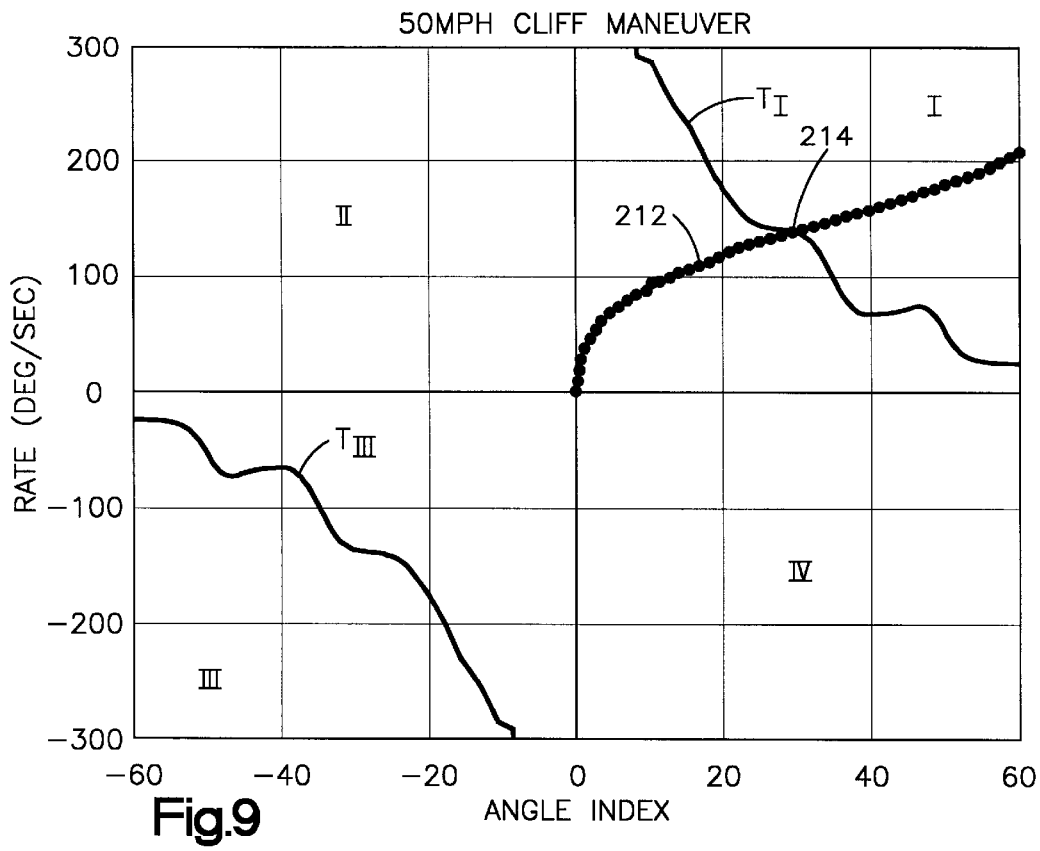

FIG. 9 shows an example of roll-rate versus indexed roll-angle for a 50 mile per hour cliff maneuver. In a cliff maneuver, the wheels of one side of the vehicle (e.g., driver side) are on the ground while the wheels on the other side (e.g., passenger side) are substantially free falling, such as being over an edge of a cliff. The plot of roll versus roll-angle, indicated at 212, is similar to a steep embankment rollover of FIG. 8. For this maneuver, the vehicle roll-rate 212 crosses the roll-rate threshold $T_I$ at an indexed roll-angle of about 30°, indicated at 214. Appropriate occupant protection equipment would, thus, be actuated in this situation provided that at least one of the latched safing conditions also are met at that same time interval so that the output of AND function 76 is TRUE.

Figure 10:
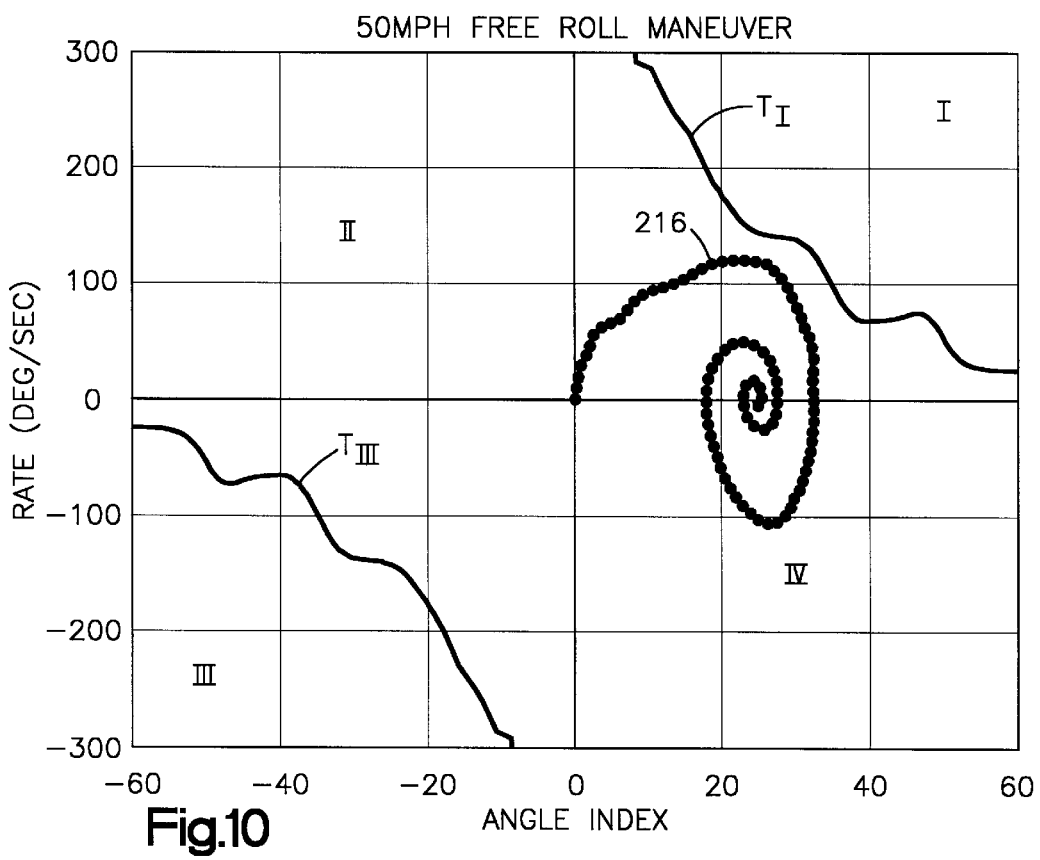
FIGS. 10 and 11 are graphical representations of roll-rate versus roll-angle index during various types of vehicle operating events that result in determinations of vehicle non-rollover conditions by the present invention.

FIG. 10 illustrates a 50 mile per hour free roll maneuver with a 25° initial roll-angle. The roll-rate versus indexed roll-angle is indicated at 216. This maneuver does not result in vehicle rollover, as the roll-rate never exceeds the threshold $T_I$ for a given roll-angle index value. In this maneuver, the vehicle begins with a 25° initial angle and returns to a 0° position and changes between positive and negative roll-rate values several times while maintaining a positive relative roll-angle (i.e., the roll-rate values are in quadrants one and two). In this example, there is no actuation of the occupant protection devices even if one of the latched safing criteria is satisfied.

Figure 11:
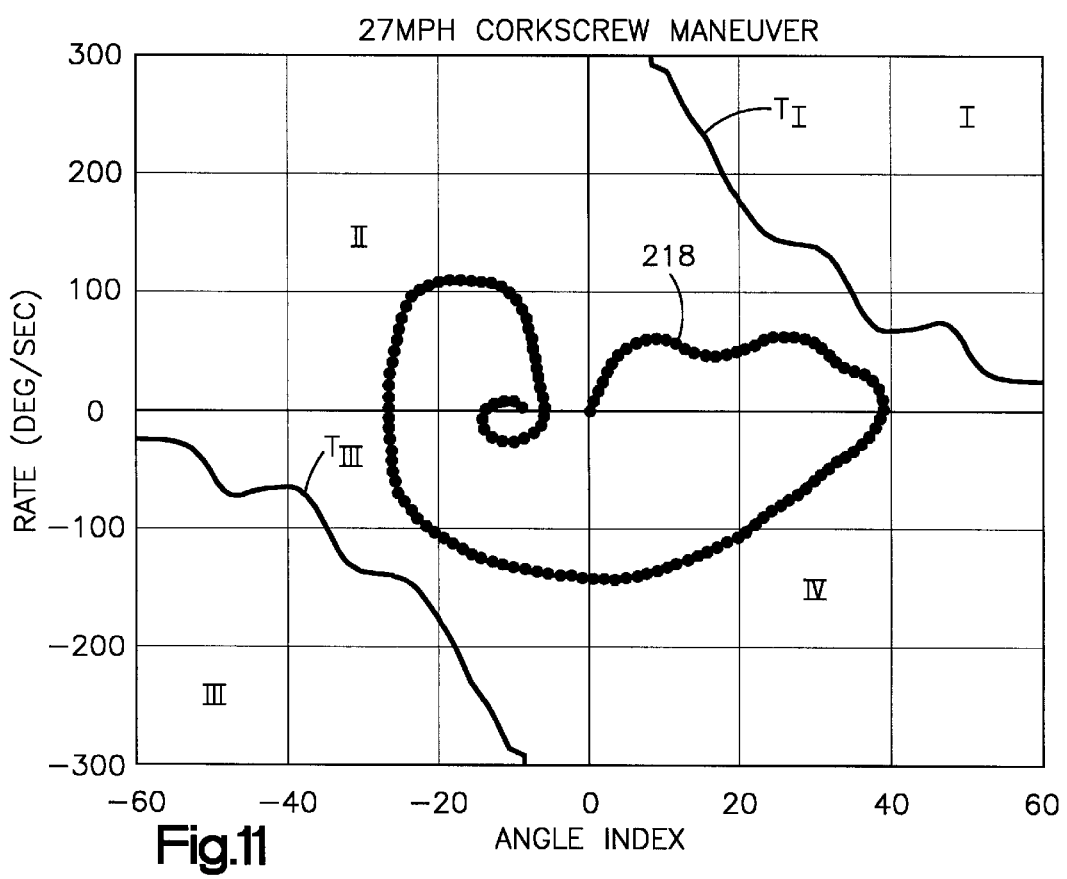

FIG. 11 is an example of a 27 mile per hour corkscrew maneuver. The roll-rate versus roll-angle values are represented as a series of dots 218. The roll-rate values 218 include both positive and negative components, indicating angular rotation of the vehicle in opposite directions about the axis of the roll-rate sensor (e.g., 14 of FIG. 1). However, the roll-rate values 218 fail to cross threshold $T_I$ in quadrant I as well as fail to cross threshold $T_{III}$ in quadrant III. Consequently, no occupant protection devices would be actuated in this situation even if one latched safing criteria is satisfied.

In view of the foregoing, the severity of rollover events can be divided into several categories as a function of the roll-rate. Each type of rollover crash condition requires unique time-to-fire characteristics due to different vehicle dynamics. The exemplary embodiment of the system described above, utilizes a threshold, which varies as a function of roll-angle, to provide appropriate time-to-fire characteristics for each type of vehicle rollover condition for that particular vehicle platform. In addition, a pair of accelerations sensors having different sensitivity levels and ratings are used to provide safing over a broad range of rollover events, including both impact-induced and non-impact-induced rollover events. A non-impact-induced rollover event typically has a much lower level of sideways acceleration and a lower roll-rate than impact-induced rollover events. In addition, impact-induced rollover events develop more quickly. Advantageously, the sensor arrangement with the present invention is capable of detecting a vehicle rollover condition for a wide range of dynamic vehicle characteristics.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for detecting a rollover condition of a vehicle, said apparatus comprising:
   a rollover sensor securable to the vehicle for sensing vehicle roll and providing a roll signal having a characteristic indicative thereof;
   a lateral acceleration sensor for sensing vehicle acceleration in a lateral direction relative to a front-to-rear axis of the vehicle and providing an acceleration signal indicative thereof; and
   a controller determining the occurrence of a vehicle rollover condition in response to the roll signal from the rollover sensor indicating a vehicle rollover condition and the sensed lateral acceleration having a value indicative of a non-impact vehicle rollover condition.

2. An apparatus for detecting a vehicle rollover event comprising:
   a rollover sensor for sensing vehicle roll and providing a roll signal indicative of vehicle roll about a front-to-rear axis of the vehicle;
   a first accelerometer for sensing vehicle acceleration in a direction offset from the front-to-rear axis of the vehicle up to a maximum acceleration sensing level and providing a first acceleration signal indicative thereof;

a second accelerometer for sensing vehicle acceleration in the offset direction at acceleration levels in excess of said maximum acceleration sensing level of said first accelerometer and providing a second acceleration signal indicative thereof; and controller for providing an actuation signal when the roll signal from the rollover sensor indicates a vehicle rollover condition and at least one of (i) the first acceleration signal indicates vehicle acceleration between a first threshold and a saturation threshold, which is less than said maximum acceleration sensing level, and (ii) the second acceleration signal indicates a vehicle acceleration greater than a second threshold which is greater than said saturation threshold.

3. The apparatus of claim 2 wherein said first accelerometer senses accelerations up to a level of 5 g and said second accelerometer senses accelerations up to a level of 50 g.

4. The apparatus of claim 2 wherein said controller includes means for comparing said first acceleration signal against said saturation threshold and when said first acceleration signal exceeds said saturation threshold, providing said actuation signal in response to said roll signal and said second acceleration signal.

5. The apparatus of claim 4 wherein said controller further includes means for comparing said second acceleration signal against said second threshold and for providing said actuation signal when said second acceleration signal is greater than said second threshold and said roll signal indicates a rollover event.

6. The apparatus of claim 2 further including a vehicle actuatable occupant protection device that is actuated in response to provision of said actuation signal.

7. The apparatus of claim 2 wherein said first and second accelerometers sense lateral acceleration of the vehicle.

8. The apparatus of claim 2 wherein said controller does not provide said actuation signal when the roll signal from the rollover sensor indicates a vehicle rollover condition and the second acceleration signal from the second accelerometer indicates a vehicle acceleration between said saturation threshold and said second threshold.

9. An apparatus for detecting a vehicle rollover event comprising:

a rollover sensor for sensing vehicle roll and providing a signal indicative of vehicle roll about a front-to-rear axis of the vehicle;

safing circuit including a low g accelerometer for sensing vehicle acceleration in a direction offset from the front-to-rear axis of the vehicle up to a maximum acceleration sensing level and providing a first acceleration signal indicative thereof and a high g accelerometer for sensing vehicle acceleration in the offset direction at acceleration levels in excess of said maximum acceleration sensing level of said first accelerometer and providing a second acceleration signal indicative thereof; and controller for determining a rollover condition in response to the safing circuit and the rollover sensor.

10. A method for detecting a vehicle rollover event comprising the steps of:

sensing vehicle roll and providing a roll signal indicative of vehicle roll about a front-to-rear axis of the vehicle;

sensing vehicle acceleration in a direction offset from the front-to-rear axis of the vehicle up to a maximum acceleration sensing level and providing a first acceleration signal indicative thereof;

sensing vehicle acceleration in the offset direction at acceleration levels in excess of said maximum acceleration sensing level and providing a second acceleration signal indicative thereof;

comparing the first acceleration signal to a saturation threshold which is less than said maximum acceleration sensing level;

selecting the first acceleration signal when the first acceleration signal is less than said saturation signal and selecting the second acceleration signal when the first acceleration signal exceeds said saturation signal; and determining a rollover condition in response to the selected one of the first and second acceleration signals and the sensed roll signal.

11. A method for detecting a rollover condition of a vehicle, said method comprising:

sensing vehicle roll and providing a roll signal having a characteristic indicative thereof;

sensing vehicle lateral acceleration in a lateral direction relative to a front-to-rear axis of the vehicle and providing an acceleration signal indicative thereof; and determining the occurrence of a vehicle rollover condition in response to the roll signal indicating a vehicle rollover condition and the acceleration signal having a value indicative of a non-impact vehicle rollover condition.

* * * * *